(12) United States Patent
Hunt et al.

(10) Patent No.: US 11,312,118 B2
(45) Date of Patent: Apr. 26, 2022

(54) CARBON FIBER NONWOVEN COMPOSITE

(71) Applicant: AVINTIV Specialty Materials Inc., Charlotte, NC (US)

(72) Inventors: Nicholas Peter Hunt, Laleham (GB); Michael Scott Carroll, Mooresville, NC (US); Daniel I Guerrero Barberena, Charlotte, NC (US); Ralph A. Moody, III, Mooresville, NC (US)

(73) Assignee: AVINTIV Specialty Materials Inc., Charlotte, NC (US)

( * ) Notice: Subject to any disclaimer, the term of this patent is extended or adjusted under 35 U.S.C. 154(b) by 22 days.

(21) Appl. No.: 17/038,404

(22) Filed: Sep. 30, 2020

(65) Prior Publication Data
US 2021/0008857 A1    Jan. 14, 2021

Related U.S. Application Data

(63) Continuation of application No. 16/529,067, filed on Aug. 1, 2019, now Pat. No. 10,828,875, which is a (Continued)

(51) Int. Cl.
*B29C 70/12* (2006.01)
*B32B 27/20* (2006.01)
(Continued)

(52) U.S. Cl.
CPC .............. *B32B 27/20* (2013.01); *B29C 70/12* (2013.01); *B32B 5/06* (2013.01); *B32B 27/36* (2013.01); *B32B 37/06* (2013.01); *D01G 13/00* (2013.01); *D04H 1/4242* (2013.01); *D04H 1/435* (2013.01); *D04H 1/46* (2013.01); *D04H 1/70* (2013.01); *D04H 1/74* (2013.01); *D04H 13/001* (2013.01); *B29K 2307/04* (2013.01); *B29K 2667/00* (2013.01); *B32B 2313/04* (2013.01)

(58) Field of Classification Search
CPC ............ D01G 13/00; D04H 1/46; D04H 1/70; D04H 1/74
See application file for complete search history.

(56) References Cited

U.S. PATENT DOCUMENTS

| 5,721,177 A | 2/1998 | Frank |
| 10,406,790 B2 | 9/2019 | Hunt et al. |
| (Continued) | | |

FOREIGN PATENT DOCUMENTS

GB    1228573    4/1971

OTHER PUBLICATIONS

Crompton T.R., Engineering Plastics, 2014, Smithers Rapra Technology LTD, p. 2 (Year: 2014).
(Continued)

*Primary Examiner* — Zachary M Davis
(74) *Attorney, Agent, or Firm* — Burr & Forman LLP

(57) ABSTRACT

Fiber-reinforced nonwoven composites having a wide variety of uses (e.g., leisure goods, aerospace, electronics, equipment, energy generation, mass transport, automotive parts, marine, construction, defense, sports and/or the like) are provided. The fiber-reinforced nonwoven composite includes a plurality of carbon fibers and a polymer matrix. The plurality of carbon fibers have an average fiber length from about 50 mm to about 125 mm. The fiber-reinforced nonwoven composite comprises a theoretical void volume from about 0% to about 10%.

19 Claims, 5 Drawing Sheets

Related U.S. Application Data continuation of application No. 15/379,968, filed on Dec. 15, 2016, now Pat. No. 10,406,790.

(60) Provisional application No. 62/268,785, filed on Dec. 17, 2015.

(51) Int. Cl.
| | | |
|---|---|---|
| *B32B 5/06* | (2006.01) | |
| *B32B 27/36* | (2006.01) | |
| *B32B 37/06* | (2006.01) | |
| *D01G 13/00* | (2006.01) | |
| *D04H 1/4242* | (2012.01) | |
| *D04H 1/435* | (2012.01) | |
| *D04H 1/46* | (2012.01) | |
| *D04H 1/70* | (2012.01) | |
| *D04H 1/74* | (2006.01) | |
| *D04H 13/00* | (2006.01) | |
| *B29K 307/04* | (2006.01) | |
| *B29K 667/00* | (2006.01) | |

(56) References Cited

U.S. PATENT DOCUMENTS

| 2013/0210298 A1 | 8/2013 | Ortlepp et al. |
| 2015/0140306 A1 | 5/2015 | Endo et al. |

OTHER PUBLICATIONS

International Search Report and Written Opinion of corresponding International Application No. PCT/US2016/066876, dated Mar. 3, 2017, all enclosed pages cited.
Second Written Opinion of corresponding international application No. PCT/US2016/066876 dated Oct. 31, 2017, all enclosed pages cited.

CARBON FIBER NONWOVEN COMPOSITE

CROSS-REFERENCE TO RELATED APPLICATIONS

This application is a continuation application of U.S. patent application Ser. No. 16/529,067 filed Aug. 1, 2019, which was a continuation of U.S. patent application Ser. No. 15/379,968 filed Dec. 15, 2016, and which claims priority from U.S. Provisional Patent Application No. 62/268,785 filed Dec. 17, 2015, and claims the benefit of its earlier filing date under 35 U.S.C. 119(e); each of U.S. patent application Ser. Nos. 16/529,067 and 15/379,968 and U.S. Provisional Patent Application No. 62/268,785 are incorporated herein by reference in their entirety.

TECHNICAL FIELD

The presently-disclosed invention relates generally to molded parts made by thermoforming a nonwoven comprising staple carbon fibers.

BACKGROUND

Carbon fibers are finding many uses in modern products as reinforcement because of their strength and stiffness. The most common approach to using carbon fibers is as woven fabrics or simply as filaments that are layered down and incorporated into a resin to form a shaped part like a boat hull, a panel for a transportation vehicle, a bicycle frame, or a blade for a wind mill. For such processes, several bobbins of carbon fiber filaments are often mounted on a creel, and the filaments are pulled together as needed. For example, a creel of bobbins may feed a beaming process, a weaving process, or even a process of forming a shape by winding filaments. However, it is fairly common to have partial bobbins left over during both the fiber manufacturing and weaving processes that are considered waste.

Attempts have been made to use the carbon fibers remaining on those partial bobbins by cutting them into staple fibers and incorporating them with other fibers into nonwovens that are subsequently used as reinforcement materials in composite structures. One approach to make such nonwovens that can be used in molding applications consists of first forming a nonwoven by carding a blend comprising thermoplastic fibers (i.e. matrix fibers) and reinforcement fibers where the matrix thermoplastic fibers have a melting point substantially lower than the melting or degradation temperature for the reinforcement fibers. Next, the nonwoven web is needled to both consolidate it and achieve a higher density. This nonwoven subsequently is used to mold a part by using heat and pressure. During this process, the majority of the matrix fibers are melted and the resulting polymer flow encases the reinforcement fibers. However, such existing nonwovens have been unable to achieve sufficient strength while simultaneously exhibiting a low void volume.

Therefore there at least remains a need for a carbon nonwoven that can be consolidated by molding the nonwoven into a thin part in such a way as achieve both a high strength and a low void volume.

SUMMARY OF INVENTION

One or more embodiments of the invention may address one or more of the aforementioned problems. Certain embodiments according to the invention provide fiber-reinforced nonwoven composites suitable for a wide variety of applications (e.g., leisure goods, aerospace, electronics, equipment, energy generation, mass transport, automotive parts, marine, construction, defense, sports and/or the like). In one aspect, the fiber-reinforced nonwoven composite includes a plurality of carbon fibers and a polymer matrix. The plurality of carbon fibers has an average fiber length from about 50 mm to about 125 mm. Moreover, the fiber-reinforced nonwoven composite comprises a theoretical void volume from about 0% to about 10%.

In accordance with certain embodiments of the invention, the plurality of carbon fibers may comprise staple fibers. In some embodiments of the invention, the plurality of carbon fibers may be uncrimped. In certain embodiments of the invention, the plurality of carbon fibers may comprise an average length from about 60 mm to about 100 mm. In other embodiments of the invention, the plurality of carbon fibers may comprise an average length from about 65 mm to about 85 mm. In some embodiments of the invention, the plurality of carbon fibers may comprise an average length of about 75 mm.

According to certain embodiments of the invention, the plurality of carbon fibers may comprise a linear mass density from about 0.1 dtex to about 1.0 dtex. In other embodiments of the invention, the plurality of carbon fibers may comprise a linear mass density from about 0.5 dtex to about 1.0 dtex. In further embodiments of the invention, the plurality of carbon fibers may comprise a linear mass density of about 0.7 dtex.

In accordance with certain embodiments of the invention, the polymer matrix may comprise a plurality of polymeric staple fibers. In some embodiments of the invention, the plurality of polymeric staple fibers may comprise at least one of a thermoplastic polymer or a thermoset polymer. According to certain embodiments of the invention, the plurality of polymeric staple fibers may comprise at least one of a polyester, a polycarbonate, a co-polyester, a polyamide, a polyphenylene sulfone, an engineering polymer, or any combination thereof. In some embodiments of the invention, the plurality of polymeric staple fibers may comprise a polyester. In further embodiments of the invention, the plurality of polymeric staple fibers may comprise polyethylene terephthalate. In certain embodiments of the invention, the plurality of polymeric staple fibers may comprise bicomponent fibers.

According to certain embodiments of the invention, the plurality of polymeric staple fibers may comprise an average length from about 1 mm to about 100 mm. In other embodiments of the invention, the plurality of polymeric staple fibers may comprise an average length from about 1 mm to about 50 mm. In further embodiments of the invention, the plurality of polymeric staple fibers may comprise an average length of about 38 mm.

According to certain embodiments of the invention, the plurality of polymeric staple fibers may comprise a linear mass density from about 1.0 dtex to about 3.0 dtex. In other embodiments of the invention, the plurality of polymeric staple fibers may comprise a linear mass density from about 1.3 dtex to about 1.8 dtex. In further embodiments of the invention, the plurality of polymeric staple fibers may comprise a linear mass density of about 1.6 dtex.

In accordance with certain embodiments of the invention, the fiber-reinforced nonwoven composite may comprise a basis weight from about 100 gsm to about 5000 gsm, alternatively, from about 500 gsm to about 5000 gsm. In other embodiments of the invention, the fiber-reinforced nonwoven composite may comprise a basis weight from about 1000 gsm to about 4000 gsm. In further embodiments of the invention, the fiber-reinforced nonwoven composite may comprise a basis weight from about 2000 gsm to about 3000 gsm. In some embodiments of the invention, the fiber-reinforced nonwoven composite may comprise a basis weight of about 2500 gsm.

In accordance with certain embodiments of the invention, the fiber-reinforced nonwoven composite may comprise an average thickness from about 0.25 mm to about 5 mm, alternatively from about 1 mm to about 5 mm. In further embodiments of the invention, the fiber-reinforced nonwoven composite may comprise an average thickness of about 2 mm. According to certain embodiments of the invention, the fiber-reinforced nonwoven composite may comprise a composite density from about 1 g/cm$^3$ to about 5 g/cm$^3$. In other embodiments of the invention, the fiber-reinforced nonwoven composite may comprise a composite density from about 1 g/cm$^3$ to about 2 g/cm$^3$. In further embodiments of the invention, the fiber-reinforced nonwoven composite may comprise a composite density from about 1.3 g/cm$^3$ to about 1.5 g/cm$^3$.

In accordance with certain embodiments of the invention, the fiber-reinforced nonwoven composite may comprise from about 10 wt. % to about 100 wt. % carbon fiber and from about 0 wt. % to about 90 wt. % polymer matrix. In other embodiments of the invention, the fiber-reinforced nonwoven composite may comprise from about 10 wt. % to about 90 wt. % carbon fiber and from about 10 wt. % to about 90 wt. % polymer matrix. In further embodiments of the invention, the fiber-reinforced nonwoven composite may comprise from about 10 wt. % to about 60 wt. % carbon fiber and from about 40 wt. % to about 90 wt. % polymer matrix. According to certain embodiments of the invention, the fiber-reinforced nonwoven composite may comprise from about 20 wt. % to about 50 wt. % carbon fiber and from about 50 wt. % to about 80 wt. % polymer matrix. In some embodiments of the invention, the fiber-reinforced nonwoven composite may comprise from about 30 wt. % to about 40 wt. % carbon fiber and from about 60 wt. % to about 70 wt. % polymer matrix.

In accordance with certain embodiments of the invention, the fiber-reinforced nonwoven composite may comprise a theoretical void volume from about −10% to about 15%. According to certain embodiments of the invention, the fiber-reinforced nonwoven composite may comprise a theoretical void volume from about 0% to about 7%. In some embodiments of the invention, the fiber-reinforced nonwoven composite may comprise a theoretical void volume from about 0% to about 5%.

In accordance with certain embodiments of the invention, the fiber-reinforced nonwoven composite may comprise a [0/90] lay-up. In some embodiments of the invention, the fiber-reinforced nonwoven composite may comprise about 40 wt. % carbon fiber and about 60 wt. % thermoplastic polymer matrix. In such embodiments of the invention, the fiber-reinforced nonwoven composite may comprise a tensile modulus from about 15 GPa to about 50 GPa. Moreover, the fiber-reinforced nonwoven composite may comprise a tensile strength from about 140 MPa to about 600 MPa. In addition, the fiber-reinforced nonwoven composite may comprise a flexural modulus from about 15 GPa to about 50 GPa. Furthermore, the fiber-reinforced nonwoven composite may comprise a flexural strength from about 290 MPa to about 465 MPa. In other embodiments of the invention, the fiber-reinforced nonwoven composite may comprise about 30 wt. % carbon fiber and about 70 wt. % thermoplastic polymer matrix. In such embodiments of the invention, the fiber-reinforced nonwoven composite may comprise a tensile modulus from about 15 GPa to about 30 GPa. Moreover, the fiber-reinforced nonwoven composite may comprise a tensile strength from about 220 MPa to about 310 MPa. In addition, the fiber-reinforced nonwoven composite may comprise a flexural modulus from about 10 GPa to about 25 GPa. Furthermore, the fiber-reinforced nonwoven composite may comprise a flexural strength from about 315 MPa to about 385 MPa.

In accordance with certain embodiments of the invention, the fiber-reinforced nonwoven composite may further comprise an epoxy resin. According to certain embodiments of the invention, the fiber-reinforced nonwoven composite may comprise a structural element utilized in an industry selected from the group consisting of leisure goods, aerospace, electronics, equipment, energy generation, mass transport, automotive parts, marine, construction, defense, and sports.

In another aspect, certain embodiments of the invention provide a process for forming a fiber-reinforced nonwoven composite. The process includes opening a plurality of carbon fibers and a plurality of polymeric staple fibers, blending the plurality of carbon fibers with the plurality of polymeric staple fibers to form a fiber blend, carding the fiber blend to form one or more homogenous webs, forming a fiber-reinforced nonwoven from the one or more homogenous webs, and molding the fiber-reinforced nonwoven to form a fiber-reinforced nonwoven composite. The plurality of carbon fibers may have an average fiber length from about 50 mm to about 125 mm. Moreover, the fiber-reinforced nonwoven composite may comprise a theoretical void volume from about 0% to about 10%. According to certain embodiments of the invention, blending the plurality of carbon fibers with the plurality of polymeric staple fibers to form a fiber blend comprises stack blending.

In accordance with certain embodiments of the invention, the process may further comprise layering a homogenous web (e.g., a first homogenous web or at least a first homogenous web from the one or more homogenous webs) upon itself in a machine direction to form a parallel-laid batt and fixing the parallel-laid batt to form the fiber-reinforced nonwoven. In certain embodiments of the invention, the molding step may comprise molding the fiber-reinforced nonwoven to form the fiber-reinforced nonwoven composite. In some embodiments of the invention, fixing the parallel-laid batt may comprise at least one of needle punching or thermal processing. According to certain embodiments of the invention, needle punching may comprise utilizing a needle penetration depth from about 5 mm to about 9 mm, from about 7 mm to about 10 mm according to certain other embodiments of the invention, or from about 10 mm to about 75 mm according to yet certain other embodiments of the invention. In other embodiments of the invention, needle punching may comprise utilizing a needle penetration depth of about 25 mm. In some embodiment of the invention, needle punching may comprise utilizing a punch density from about 50 punches/cm$^2$ to about 100 punches/cm$^2$. In further embodiments of the invention, needle punching may comprise utilizing a punch density of about 75 punches/cm$^2$. In some embodiments of the invention, thermal processing may comprise thermal point bonding. According to certain embodiments of the invention, molding the fiber-reinforced nonwoven to form the fiber-reinforced nonwoven composite may comprise a molding temperature from about 150° C. to about 300° C., from about 200° C. to about 300° C. or from about 200° C. to about 400° C. In other embodiments of the invention, molding the fiber-reinforced nonwoven to form the fiber-reinforced nonwoven composite may comprise a molding temperature from about 225° C. to about 275° C. In further embodiments of the invention, molding the fiber-reinforced nonwoven to form the fiber-reinforced nonwoven composite may comprise a molding temperature of about 260° C. In some embodiments of the invention, molding the fiber-reinforced nonwoven to form the fiber-reinforced nonwoven composite may comprise hot compression molding.

In accordance with certain embodiments of the invention, the plurality of carbon fibers may comprise staple fibers. In some embodiments of the invention, the plurality of carbon fibers may be uncrimped. In certain embodiments of the invention, the plurality of carbon fibers may comprise an average length from about 60 mm to about 100 mm. In further embodiments of the invention, the plurality of carbon fibers may comprise an average length from about 65 mm to about 85 mm. In some embodiments of the invention, the plurality of carbon fibers may comprise an average length of about 75 mm.

According to certain embodiments of the invention, the plurality of carbon fibers may comprise a linear mass density from about 0.1 dtex to about 1.0 dtex. In other embodiments of the invention, the plurality of carbon fibers may comprise a linear mass density from about 0.5 dtex to about 1.0 dtex. In further embodiments of the invention, the plurality of carbon fibers may comprise a linear mass density of about 0.7 dtex.

In accordance with certain embodiments of the invention, the polymer matrix may comprise a plurality of polymeric staple fibers. In some embodiments of the invention, the plurality of polymeric staple fibers may comprise at least one of a thermoplastic polymer or a thermoset polymer. According to certain embodiments of the invention, the plurality of polymeric staple fibers may comprise at least one of a polyester, a polycarbonate, a co-polyester, a polyamide, a polyphenylene sulfone, an engineering polymer, or any combination thereof. In some embodiments of the invention, the plurality of polymeric staple fibers may comprise a polyester. In further embodiments of the invention, the plurality of polymeric staple fibers may comprise polyethylene terephthalate. In certain embodiments of the invention, the plurality of polymeric staple fibers may comprise bicomponent fibers.

According to certain embodiments of the invention, the plurality of polymeric staple fibers may comprise an average length from about 1 mm to about 100 mm. In other embodiments of the invention, the plurality of polymeric staple fibers may comprise an average length from about 1 mm to about 50 mm. In further embodiments of the invention, the plurality of polymeric staple fibers may comprise an average length of about 38 mm.

According to certain embodiments of the invention, the plurality of polymeric staple fibers may comprise a linear mass density from about 1.0 dtex to about 3.0 dtex. In other embodiments of the invention, the plurality of polymeric staple fibers may comprise a linear mass density from about 1.3 dtex to about 1.8 dtex. In further embodiments of the invention, the plurality of polymeric staple fibers may comprise a linear mass density of about 1.6 dtex.

In accordance with certain embodiments of the invention, the fiber-reinforced nonwoven composite may comprise a basis weight from about 100 gsm to about 5000 gsm or from about 1000 gsm to about 5000 gsm. In other embodiments of the invention, the fiber-reinforced nonwoven composite may comprise a basis weight from about 1500 gsm to about 4000 gsm. In further embodiments of the invention, the fiber-reinforced nonwoven composite may comprise a basis weight from about 2000 gsm to about 3000 gsm. In some embodiments of the invention, the fiber-reinforced nonwoven composite may comprise a basis weight of about 2500 gsm.

In accordance with certain embodiments of the invention, the fiber-reinforced nonwoven composite may comprise an average thickness from about 1 mm to about 5 mm. In further embodiments of the invention, the fiber-reinforced nonwoven composite may comprise an average thickness of about 1.75 mm. According to certain embodiments of the invention, the fiber-reinforced nonwoven composite may comprise a composite density from about 1 $g/cm^3$ to about 5 $cm^3$. In other embodiments of the invention, the fiber-reinforced nonwoven composite may comprise a composite density from about 1 $g/cm^3$ to about 2 $cm^3$. In further embodiments of the invention, the fiber-reinforced nonwoven composite may comprise a composite density from about 1.3 $g/cm^3$ to about 1.5 $g/cm^3$.

In accordance with certain embodiments of the invention, the fiber-reinforced nonwoven composite may comprise from about 10 wt. % to about 100 wt. % carbon fiber and from about 0 wt. % to about 90 wt. % polymer matrix. In other embodiments of the invention, the fiber-reinforced nonwoven composite may comprise from about 10 wt. % to about 90 wt. % carbon fiber and from about 10 wt. % to about 90 wt. % polymer matrix. In further embodiments of the invention, the fiber-reinforced nonwoven composite may comprise from about 10 wt. % to about 60 wt. % carbon fiber and from about 40 wt. % to about 90 wt. % polymer matrix. According to certain embodiments of the invention, the fiber-reinforced nonwoven composite may comprise from about 20 wt. % to about 50 wt. % carbon fiber and from about 50 wt. % to about 80 wt. % polymer matrix. In some embodiments of the invention, the fiber-reinforced nonwoven composite may comprise from about 30 wt. % to about 40 wt. % carbon fiber and from about 60 wt. % to about 70 wt. % polymer matrix.

In accordance with certain embodiments of the invention, the fiber-reinforced nonwoven composite may comprise a theoretical void volume from about −10% to about 15%. According to certain embodiments of the invention, the fiber-reinforced nonwoven composite may comprise a theoretical void volume from about 0% to about 7%. In some embodiments of the invention, the fiber-reinforced nonwoven composite may comprise a theoretical void volume from about 0% to about 5%.

In accordance with certain embodiments of the invention, the fiber-reinforced nonwoven composite may comprise a plurality of homogenous webs having a [0/90] lay-up. In some embodiments of the invention, the fiber-reinforced nonwoven composite may comprise about 40 wt. % carbon fiber and about 60 wt. % thermoplastic polymer matrix. In such embodiments of the invention, the fiber-reinforced nonwoven composite may comprise a tensile modulus from about 15 GPa to about 50 GPa. Moreover, the fiber-reinforced nonwoven composite may comprise a tensile strength from about 140 MPa to about 600 MPa. In addition, the fiber-reinforced nonwoven composite may comprise a flexural modulus from about 15 GPa to about 50 GPa. Furthermore, the fiber-reinforced nonwoven composite may comprise a flexural strength from about 290 MPa to about 465 MPa. In other embodiments of the invention, the fiber-reinforced nonwoven composite may comprise about 30 wt. % carbon fiber and about 70 wt. % thermoplastic polymer matrix. In such embodiments of the invention, the fiber-reinforced nonwoven composite may comprise a tensile modulus from about 15 GPa to about 30 GPa. Moreover, the fiber-reinforced nonwoven composite may comprise a tensile strength from about 220 MPa to about 310 MPa. In addition, the fiber-reinforced nonwoven composite may comprise a flexural modulus from about 10 GPa to about 25 GPa. Furthermore, the fiber-reinforced nonwoven composite may comprise a flexural strength from about 315 MPa to about 385 MPa.

In accordance with certain embodiments of the invention, the fiber-reinforced nonwoven composite may further comprise an epoxy resin. According to certain embodiments of the invention, the fiber-reinforced nonwoven composite may comprise a structural element utilized in an industry selected from the group consisting of leisure goods, aerospace, electronics, equipment, energy generation, mass transport, automotive parts, marine, construction, defense, and sports.

BRIEF DESCRIPTION OF THE DRAWING(S)

The invention now will be described hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein.

DETAILED DESCRIPTION

Figure 1A:
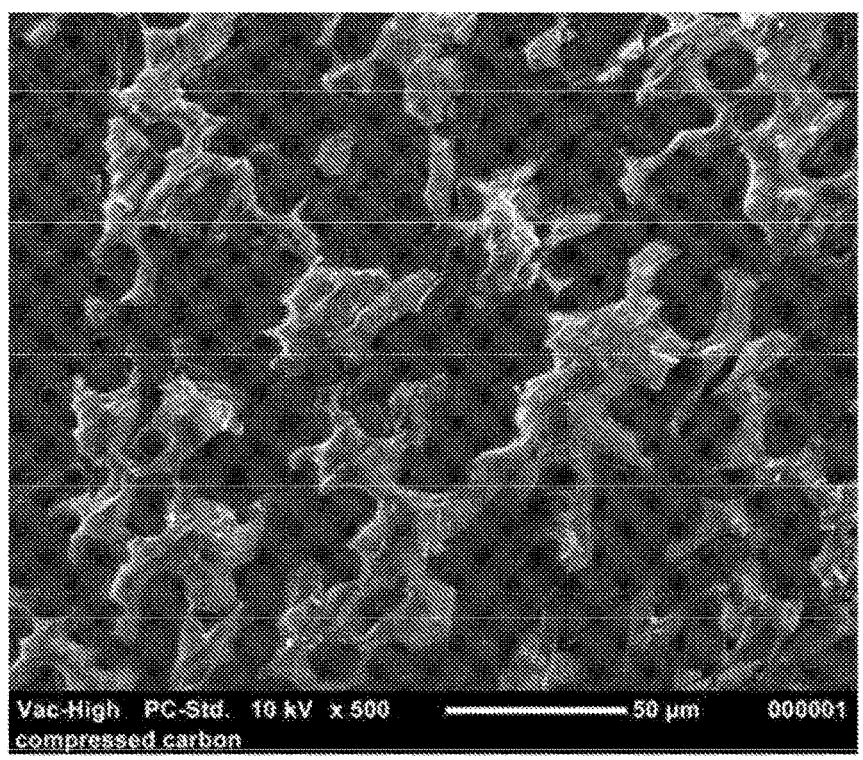
FIG. 1A is a high compression edge view of a fiber-reinforced nonwoven composite according to an embodiment of the invention.

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The invention includes, according to certain embodiments, fiber-reinforced nonwoven composites having a wide variety of uses (e.g., leisure goods, aerospace, electronics, equipment, energy generation, mass transport, automotive parts, marine, construction, defense, sports and/or the like). The fiber-reinforced nonwoven composite includes a plurality of reinforcement fibers (e.g., carbon fibers) and a polymer matrix. The plurality of carbon fibers may comprise an average fiber length from about 50 mm to about 125 mm. The fiber-reinforced nonwoven composite may comprise a theoretical void volume from about 0% to about 10%. In this regard, a fiber-reinforced nonwoven can be consolidated by molding the nonwoven into a thin part (e.g., a fiber-reinforced nonwoven composite) in such a way as achieve both a high flexural strength and a low void volume.

I. Definitions

The terms "polymer" or "polymeric", as used interchangeably herein, may comprise homopolymers, copolymers, such as, for example, block, graft, random, and alternating copolymers, terpolymers, etc., and blends and modifications thereof. Furthermore, unless otherwise specifically limited, the term "polymer" or "polymeric" shall include all possible structural isomers; stereoisomers including, without limitation, geometric isomers, optical isomers or enantionmers; and/or any chiral molecular configuration of such polymer or polymeric material. These configurations include, but are not limited to, isotactic, syndiotactic, and atactic configurations of such polymer or polymeric material.

The terms "nonwoven" and "nonwoven web", as used herein, may comprise a web having a structure of individual fibers, filaments, and/or threads that are interlaid but not in an identifiable repeating manner as in a knitted or woven fabric. Nonwoven fabrics or webs, according to certain embodiments of the invention, may be formed by any process conventionally known in the art such as, for example, meltblowing processes, spunbonding processes, hydroentangling, air-laid, and bonded carded web processes.

The term "layer", as used herein, may comprise a generally recognizable combination of similar material types and/or functions existing in the X-Y plane.

The term "bicomponent fibers", as used herein, may comprise fibers formed from at least two different polymers extruded from separate extruders but spun together to form one fiber. Bicomponent fibers are also sometimes referred to as conjugate fibers or multicomponent fibers. The polymers are arranged in a substantially well-defined position in distinct zones across the cross-section of the bicomponent fibers and extend continuously along the length of the bicomponent fibers. The configuration of such a bicomponent fiber may be, for example, a sheath/core arrangement wherein one polymer is surrounded by another, or may be a side-by-side arrangement, a pie arrangement, or an "islands-in-the-sea" arrangement, each as is known in the art of multicomponent, including bicomponent fibers. The "bicomponent fibers" may be thermoplastic fibers that comprise a core fiber made from one polymer that is encased within a thermoplastic sheath made from a different polymer or have a side-by-side arrangement of different thermoplastic fibers. The first polymer often melts at a different, typically lower, temperature than the second polymer. In the sheath/core arrangement, these bicomponent fibers provide thermal bonding due to melting of the sheath polymer, while retaining the desirable strength characteristics of the core polymer. In the side-by-side arrangement, the fibers shrink and crimp creating z-direction expansion.

The term "composite", as used herein, may be a structure comprising two or more layers, such as a film layer and a fiber layer or a plurality of fiber layers molded together. The layers of a composite structure may be joined together such that a substantial portion of their common X-Y plane interface, according to certain embodiments of the invention.

The term "theoretical void volume", as used herein, may generally refer to the difference between the volume of a part section and the volume theoretically occupied by components forming the part section. This difference is expressed as a percentage of the volume of the part section. To determine the theoretical void volume, an estimate of the matrix fiber density Dm (g/cm³), the density of the carbon fiber Dc (g/cm³), the percentage of each of the matrix fiber Vm and the carbon fiber Vc in the composite, the volume of a part section sample Vt (cm³), and the weight of that part Wp (g) are required.

First the average density Da of the component is calculated:

$$Da=[Dm*Vm+Dc*Vc]/100 \quad (1)$$

The void volume Vv is the difference between the theoretical volume of the part Vt (calculated based on its weight Wp and estimated average density Da) and the actual volume Va of the part expressed as a percentage of the actual volume of the part Va.

$$Vv=[(Va-Vt)/Va]*100 \quad (2)$$

Where:

$$Vt=(Wp/Da) \quad (3)$$

Va for a flat panel is calculated for a coupon based on the width W (cm), length L (cm), thickness T (cm), and the weight of the coupon Wc (g).

$$Va=Wc*(W*L*T) \quad (4)$$

For different shapes, different equations may be used following the same principles.

The term "composite tensile strength", as used herein, may generally refer to the sum of the tensile strength measured in the machine direction and the tensile strength measured in the cross direction.

II. Fiber-Reinforced Nonwoven Composite

Figure 1B:
FIG. 1B is a low compression edge view of the fiber-reinforced nonwoven composite of FIG. 1A.

Certain embodiments according to the invention provide fiber-reinforced nonwoven composites suitable for a wide variety of applications (e.g., leisure goods, aerospace, electronics, equipment, energy generation, mass transport, automotive parts, marine, construction, defense, sports and/or the like). In one aspect, the fiber-reinforced nonwoven composite includes a plurality of carbon fibers and a polymer matrix. The plurality of reinforcement fibers (e.g., carbon fibers) may have an average fiber length from about 50 mm to about 125 mm. To form the fiber-reinforced nonwoven composite, one or more fiber-reinforced nonwoven webs may be cross-lapped in a variety of configurations and then may be subjected to a molding operation. The one or more fiber-reinforced nonwoven webs nonwovens that may be used in the molding operation may be formed by carding a blend comprising thermoplastic fibers (i.e. matrix fibers) and reinforcement fibers where the matrix thermoplastic fibers have a melting point substantially lower than the melting or degradation temperature for the reinforcement fibers. In this regard, the fiber-reinforced nonwoven composite may comprise a theoretical void volume from about 0% to about 10%. FIGS. 1A and 1B, for instance, illustrate high and low compression edge views respectively of a fiber-reinforced nonwoven composite according to an example embodiment. FIG. 1A shows areas of fusion, where the matrix fibers have been melted and consolidated to form a continuous matrix. FIG. 1B shows reinforcing fibers in aligned configurations surrounded by a melted and/or fused matrix.

A. Reinforcement Fibers (e.g., Carbon Fibers)

In accordance with certain embodiments of the invention, for instance, the plurality of reinforcement fibers (e.g., carbon fibers) may comprise staple fibers. In some embodiments of the invention, for example, the plurality of carbon fibers may be uncrimped.

According to certain embodiments of the invention, for instance, the plurality of carbon fibers may comprise an average length from about 50 mm to about 125 mm. In other embodiments of the invention, for example, the plurality of carbon fibers may comprise an average length from about 60 mm to about 100 mm. In further embodiments of the invention, for instance, the plurality of carbon fibers may comprise an average length from about 65 mm to about 85 mm. In some embodiments of the invention, for example, the plurality of carbon fibers may comprise an average length of about 75 mm. As such, in certain embodiments of the invention, the plurality of carbon fibers may comprise an average length from at least about any of the following: 50, 55, 60, 65, 70, and 75 mm and/or at most about 125, 100, 95, 90, 85, 80, and 75 mm (e.g., about 50-80 mm, about 75-100 mm, etc.).

According to certain embodiments of the invention, for instance, the plurality of carbon fibers may comprise a linear mass density from about 0.1 dtex to about 1.0 dtex. In other embodiments of the invention, for example, the plurality of carbon fibers may comprise a linear mass density from about 0.5 dtex to about 1.0 dtex. In further embodiments of the invention, for instance, the plurality of carbon fibers may comprise a linear mass density of about 0.7 dtex. As such, in certain embodiments of the invention, the plurality of carbon fibers may comprise a linear mass density from at least about any of the following: 0.1, 0.2, 0.3, 0.4, 0.5, 0.6, and 0.7 dtex and/or at most about 1.0, 0.9, 0.8, and 0.7 dtex (e.g., about 0.3-0.7 dtex, about 0.5-1.0 dtex, etc.).

B. Polymer Matrix

In accordance with certain embodiments of the invention, for example, the polymer matrix may comprise a plurality of polymeric staple fibers. In some embodiments of the invention, for instance, the plurality of polymeric staple fibers may comprise at least one of a thermoplastic polymer or a thermoset polymer. According to certain embodiments of the invention, for example, the plurality of polymeric staple fibers may comprise at least one of a polyester, a polycarbonate, a co-polyester, a polyamide, a polyphenylene sulfone, an engineering polymer, or any combination thereof. In some embodiments of the invention, for instance, the plurality of polymeric staple fibers may comprise a polyester. In further embodiments of the invention, for example, the plurality of polymeric staple fibers may comprise polyethylene terephthalate. In certain embodiments of the invention, for instance, the plurality of polymeric staple fibers may comprise bicomponent fibers. In some embodiments of the invention, for example, the plurality of polymeric staple fibers may comprise a substantially lower melting temperature than the melting and/or degradation temperature of the carbon fibers.

According to certain embodiments of the invention, for example, the plurality of polymeric staple fibers may comprise an average length from about 1 mm to about 100 mm. In other embodiments of the invention, for instance, the plurality of polymeric staple fibers may comprise an average length from about 1 mm to about 50 mm. In further embodiments of the invention, for example, the plurality of polymeric staple fibers may comprise an average length of about 38 mm. As such, in certain embodiments of the invention, the plurality of carbon fibers may comprise an average length from at least about any of the following: 1, 10, 20, 30, 35, and 38 mm and/or at most about 50, 48, 45, 42, 40, and 38 mm (e.g., about 20-50 mm, about 35-42 mm, etc.).

According to certain embodiments of the invention, for instance, the plurality of polymeric staple fibers may comprise a linear mass density from about 1.0 dtex to about 3.0 dtex. In other embodiments of the invention, for example, the plurality of polymeric staple fibers may comprise a linear mass density from about 1.3 dtex to about 1.8 dtex. In further embodiments of the invention, for instance, the plurality of polymeric staple fibers may comprise a linear mass density of about 1.6 dtex. As such, in certain embodiments of the invention, the plurality of carbon fibers may comprise a linear mass density from at least about any of the following: 1.0, 1.1, 1.2, 1.3, 1.4, 1.5, and 1.6 dtex and/or at most about 3.0, 2.0, 1.9, 1.8, 1.7, and 1.6 dtex (e.g., about 1.1-1.7 dtex, about 1.5-1.7 dtex, etc.).

C. Structure of the Fiber-Reinforced Nonwoven Composite

In accordance with certain embodiments of the invention, a homogenous web of the carded fiber blend of reinforcement fibers (e.g., carbon fibers) and polymer matrix fibers may be layered upon itself, for example in a machine direction (e.g., the longest dimension of the homogenous web), in a parallel configuration to form a parallel-laid batt. The formed parallel-laid batt may be fixed, such as by needle-punching, to form a fiber-reinforced nonwoven. The fiber-reinforced nonwoven may be subjected to a molding operation to form a fiber-reinforced nonwoven composite according to certain embodiments of the invention. In accordance with certain embodiments of the invention, the homogenous web may be fixed, such as by needle-punching, prior to being layered upon itself, for example in a machine direction (e.g., the longest dimension of the homogenous web) in a parallel configuration as discussed above.

In accordance with certain embodiments of the invention, a plurality of individual homogenous webs of the carded fiber blend of carbon fibers and polymer matrix fibers may be laid-up in a variety of different configurations (e.g., lay-up orientations). For example, the plurality of individual homogenous webs may be subjected to a variety of lay-up orientations relative to each other (e.g., parallel-laid, orthogonally-laid, etc.). Each of the homogenous webs may be independently laid relative to adjacent homogenous webs. By way of example only, embodiments of the invention may comprise a first homogenous web being aligned in a first direction laid directly or indirectly onto or over a second homogenous web being aligned in a second direction, in which the first direction and the second direction are not the same. For instance, the first direction may be considered to be at 0° (as a point of reference) and the second direction may comprise 90° relative to the first direction (e.g., from between 5-175°, 20-160°, 40-140°, 60-120°, 80-100° relative to the first direction). For example, a [0/90] lay-up orientation references a first homogenous web aligned in a direction considered to be at 0° (as a point of reference) and a second homogenous web laid on top or over the first homogenous web, in which the second homogenous web is aligned in direction 90° relative to the alignment of the first homogenous web. In accordance with certain embodiments, the laid-up homogenous webs may define a fiber batt. The formed batt may be fixed, such as by needle-punching, to form a fiber-reinforced nonwoven. The fiber-reinforced nonwoven may be subjected to a molding operation to form a fiber-reinforced nonwoven composite according to certain embodiments of the invention. In accordance with certain embodiments of the invention, each of the homogenous webs may be fixed, such as by needle-punching, prior to being laid-up in various configurations as discussed above.

In accordance with certain embodiments of the invention, for example, the fiber-reinforced nonwoven composite may comprise a basis weight from about 1000 gsm to about 5000 gsm. In other embodiments of the invention, for instance, the fiber-reinforced nonwoven composite may comprise a basis weight from about 1500 gsm to about 4000 gsm. In further embodiments of the invention, for example, the fiber-reinforced nonwoven composite may comprise a basis weight from about 2000 gsm to about 3000 gsm. In some embodiments of the invention, for instance, the fiber-reinforced nonwoven composite may comprise a basis weight of about 2500 gsm. As such, in certain embodiments of the invention, the fiber-reinforced nonwoven composite may comprise a basis weight from at least about any of the following: 1000, 1500, 2000, and 2500 gsm and/or at most about 5000, 4500, 4000, 3500, 3000, and 2500 gsm (e.g., about 1000-4000 gsm, about 2000-3000 gsm, etc.).

In accordance with certain embodiments of the invention, for example, the fiber-reinforced nonwoven composite may comprise an average thickness from about 1 mm to about 3 mm. In further embodiments of the invention, for instance, the fiber-reinforced nonwoven composite may comprise an average thickness of about 1.75 mm. As such, in certain embodiments of the invention, the fiber-reinforced nonwoven composite may comprise an average thickness from at least about any of the following: 1, 1.25, 1.5, and 1.75 mm and/or at most about 3, 2.75, 2.5, 2.25, 2, and 1.75 mm (e.g., about 1.5-3 mm, about 1-2 mm, etc.).

According to certain embodiments of the invention, for example, the fiber-reinforced nonwoven composite may comprise a composite density from about 1 g/cm$^3$ to about 5 g/cm$^3$. In other embodiments of the invention, for instance, the fiber-reinforced nonwoven composite may comprise a composite density from about 1 g/cm$^3$ to about 2 g/cm$^3$. In further embodiments of the invention, for example, the fiber-reinforced nonwoven composite may comprise a composite density from about 1.3 g/cm$^3$ to about 1.5 g/cm$^3$. As such, in certain embodiments of the invention, the fiber-reinforced nonwoven composite may comprise a composite density from at least about any of the following: 1, 1.1, 1.2, and 1.3 g/cm$^3$ and/or at most about 5, 4, 3, 2, and 1.5 g/cm$^3$ (e.g., about 1.1-1.5 g/cm$^3$, about 1.3-5 g/cm$^3$, etc.).

In accordance with certain embodiments of the invention, for instance, the fiber-reinforced nonwoven composite may comprise from about 10 wt. % to about 100 carbon fiber and from about 0 wt. % to about 90 wt. % polymer matrix. In other embodiments of the invention, for example, the fiber-reinforced nonwoven composite may comprise from about 10 wt. % to about 90 wt. % carbon fiber and from about 10 wt. % to about 90 wt. % polymer matrix. In further embodiments of the invention, for instance, the fiber-reinforced nonwoven composite may comprise from about 10 wt. % to about 60 wt. % carbon fiber and from about 40 wt. % to about 90 wt. % polymer matrix. According to certain embodiments of the invention, for example, the fiber-reinforced nonwoven composite may comprise from about 20 wt. % to about 50 wt. % carbon fiber and from about 50 wt. % to about 80 wt. % polymer matrix. In some embodiments of the invention, for instance, the fiber-reinforced nonwoven composite may comprise from about 30 wt. % to about 40 wt. % carbon fiber and from about 60 wt. % to about 70 wt. % polymer matrix. As such, in certain embodiments of the invention, the fiber-reinforced nonwoven composite may comprise a weight percentage of carbon fiber from at least about any of the following: 10, 15, 20, 25, and 30 wt. % and/or at most about 100, 90, 60, 50, and 40 wt. % (e.g., about 30-50 wt. %, about 25-60 wt. %, etc.). Moreover, in certain embodiments of the invention, the fiber-reinforced nonwoven composite may comprise a weight percentage of polymer matrix from at least about any of the following: 0, 5, 10, 20, 30, 40, 50, and 60 wt. % and/or at most about 90, 85, 80, 75, and 70 wt. % (e.g., about 40-80 wt. %, about 60-90 wt. %, etc.).

In accordance with certain embodiments of the invention, for example, the fiber-reinforced nonwoven composite may comprise a theoretical void volume from about −10% to about 15%. According to certain embodiments of the invention, for instance, the fiber-reinforced nonwoven composite may comprise a theoretical void volume from about 0% to about 10%. In some embodiments of the invention, for example, the fiber-reinforced nonwoven composite may comprise a theoretical void volume from about 0% to about 7%. In further embodiments of the invention, for instance, the fiber-reinforced nonwoven composite may comprise a theoretical void volume from about 0% to about 5%. In other embodiments of the invention, for example, the fiber-reinforced nonwoven composite may comprise a theoretical void volume from about 0% to about 1%. As such, in certain embodiments of the invention, the fiber-reinforced nonwoven composite may comprise a theoretical void volume from at least about any of the following: −10, −9, −8, −7, −6, −5, −4, −3, −2, −1, and 0% and/or at most about 15, 12, 10, 9, 8, 7, 6, 5, 4, 3, 2, and 1% (e.g., about 0-12%, about 0-5%, etc.).

In accordance with certain embodiments of the invention, for instance, the fiber-reinforced nonwoven composite may comprise a [0/90] lay-up. In some embodiments of the invention, for example, the fiber-reinforced nonwoven composite may comprise about 40 wt. % carbon fiber and about 60 wt. % thermoplastic polymer matrix. In such embodiments of the invention, for instance, the fiber-reinforced nonwoven composite may comprise a tensile modulus from about 15 GPa to about 50 GPa. Moreover, for example, the fiber-reinforced nonwoven composite may comprise a tensile strength from about 140 MPa to about 600 MPa. In addition, for instance, the fiber-reinforced nonwoven composite may comprise a flexural modulus from about 15 GPa, to about 50 GPa. Furthermore, for example, the fiber-reinforced nonwoven composite may comprise a flexural strength from about 290 MPa to about 465 MPa.

In other embodiments of the invention, for instance, the fiber-reinforced nonwoven composite may comprise a [0/90] lay-up, about 30 wt. % carbon fiber, and about 70 wt. % thermoplastic polymer matrix. In such embodiments of the invention, for example, the fiber-reinforced nonwoven composite may comprise a tensile modulus from about 15 GPa to about 30 GPa. Moreover, for instance, the fiber-reinforced nonwoven composite may comprise a tensile strength from about 220 MPa to about 310 MPa. In addition, for example, the fiber-reinforced nonwoven composite may comprise a flexural modulus from about 10 GPa to about 25 GPa. Furthermore, for instance, the fiber-reinforced nonwoven composite may comprise a flexural strength from about 315 MPa to about 385 MPa.

In accordance with certain embodiments of the invention, for example, the fiber-reinforced nonwoven composite may further comprise an epoxy resin. According to certain embodiments of the invention, for instance, the fiber-reinforced nonwoven composite may comprise a structural element utilized in an industry selected from the group consisting of leisure goods, aerospace, electronics, equipment, energy generation, mass transport, automotive parts, marine, construction, defense, and sports.

III. Process for Forming a Fiber-Reinforced Nonwoven Composite

In another aspect, certain embodiments of the invention provide a process for forming a fiber-reinforced nonwoven composite. The process includes opening a plurality of reinforcement fibers (e.g., carbon fibers) and a plurality of polymeric staple fibers, blending the plurality of carbon fibers with the plurality of polymeric staple fibers to form a fiber blend, carding the fiber blend to form one or more homogenous webs, forming a fiber-reinforced nonwoven from the one or more homogenous webs, and molding the fiber-reinforced nonwoven to form a fiber-reinforced nonwoven composite. The plurality of carbon fibers may have an average fiber length from about 50 mm to about 125 mm. Moreover, the fiber-reinforced nonwoven composite may comprise a theoretical void volume from about 0% to about 10%.

According to certain embodiments of the invention, for example, blending the plurality of carbon fibers with the plurality of polymeric staple fibers to form a fiber blend comprises stack blending. Moreover, in accordance with certain embodiments of the invention, for instance, the process may further comprise layering a homogenous web upon itself in a machine direction or a cross direction to form a parallel-laid batt and fixing the parallel-laid batt to form the fiber-reinforced nonwoven. In some embodiments of the invention, for example, the molding step may comprise molding the fiber-reinforced nonwoven to form the fiber-reinforced nonwoven composite.

Figure 2:
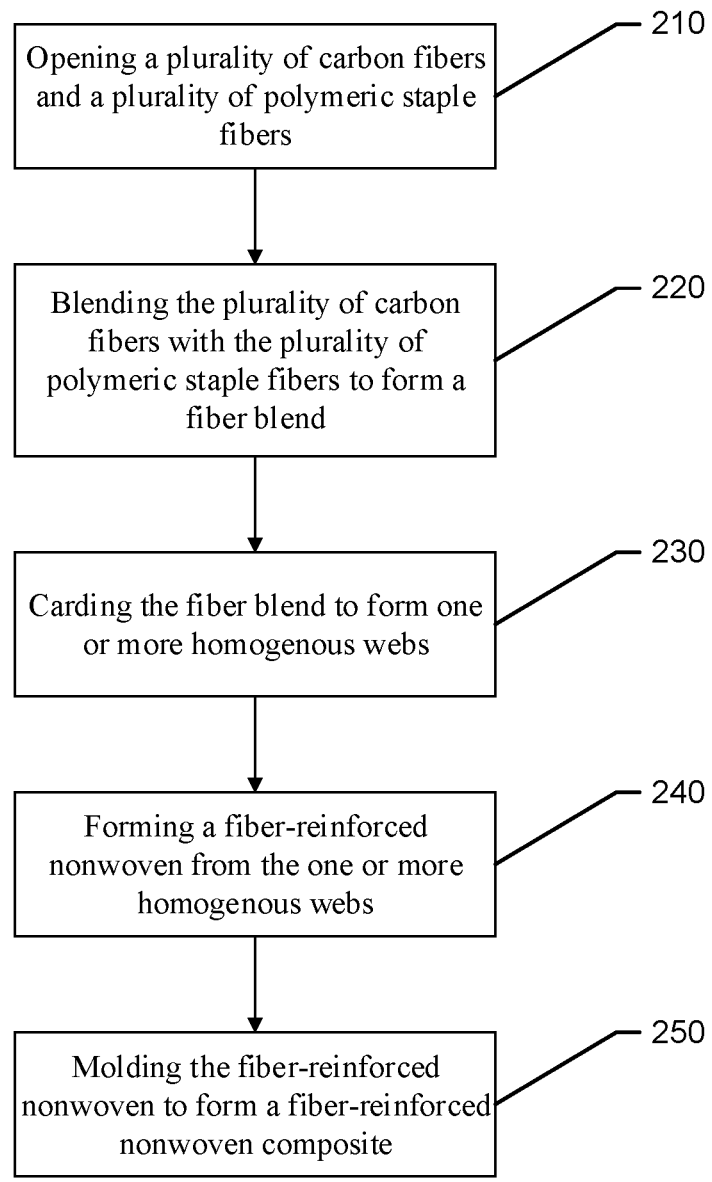
FIG. 2 illustrates a block diagram of a process for forming a fiber-reinforced nonwoven composite according to an embodiment of the invention.
Figure 3:
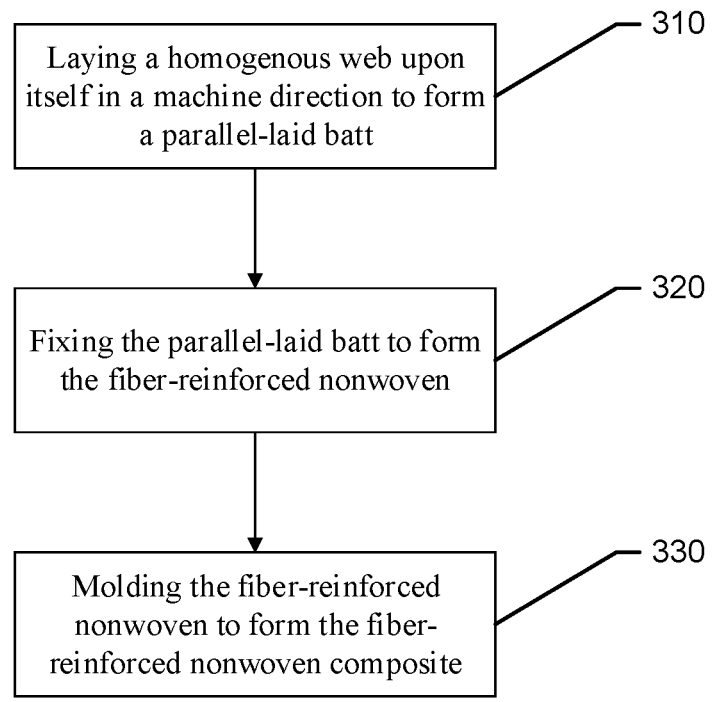
FIG. 3 illustrates a block diagram of a process for forming a fiber-reinforced nonwoven according to an embodiment of the invention.

FIG. 2, for example, illustrates a block diagram of a process for forming a fiber-reinforced nonwoven composite according to an embodiment of the invention. As shown in FIG. 2, for example, the process includes opening a plurality of carbon fibers and a plurality of polymeric staple fibers at operation 210, blending the plurality of carbon fibers with the plurality of polymeric staple fibers to form a fiber blend at operation 220, carding the fiber blend to form one or more homogenous webs at operation 230, forming a fiber-reinforced nonwoven from the one or more homogenous webs at operation 240, and molding the fiber-reinforced nonwoven to form a fiber-reinforced nonwoven composite at operation 250. Moreover, FIG. 3, for instance, illustrates a block diagram of a process for forming a fiber-reinforced nonwoven according to an embodiment of the invention. As shown in FIG. 3, for example, the process includes layering a homogenous web upon itself in a machine direction to form a parallel-laid batt at operation 310, fixing the parallel-laid batt to form the fiber-reinforced nonwoven at operation 320, and molding the fiber-reinforced nonwoven to form the fiber-reinforced nonwoven composite at operation 330.

In some embodiments of the invention, for example, fixing the parallel-laid batt may comprise at least one of needle punching or thermal processing. According to certain embodiments of the invention, for instance, needle punching may comprise utilizing a needle penetration depth from about 5 mm to about 9 mm, from about 7 mm to about 10 mm according to certain other embodiments of the invention, or from about 10 mm to about 75 mm according to yet certain other embodiments of the invention. In other embodiments of the invention, for example, needle punching may comprise utilizing a needle penetration depth of about 7 mm or about 25 mm according to certain other embodiments of the invention. As such, in certain embodiments of the invention, needle punching may comprise utilizing a needle penetration depth from at least about any of the following: 5, 5.5, 6, 6.5, and 7 mm and/or at most about 75, 50, 25, 15, 10, 9, 8.5, 8, 7.5, and 7 mm (e.g., about 5.5-75 mm, about 6.5-25 mm, etc.). The needle penetration depth may be from about 7 mm to about 10 mm according to certain other embodiments of the invention or from about 10 mm to about 75 mm according to yet certain other embodiments of the invention.

In some embodiment of the invention, for example, needle punching may comprise utilizing a punch density from about 50 punches/cm$^2$ to about 100 punches/cm$^2$. In further embodiments of the invention, for instance, needle punching may comprise utilizing a punch density of about 75 punches/cm$^2$. As such, in certain embodiments of the invention, needle punching may comprise utilizing a punch density from at least about any of the following: 50, 55, 60, 65, 70, and 75 punches/cm$^2$ and/or at most about 100, 95, 90, 85, 80, and 75 punches/cm$^2$ (e.g., about 60-85 punches/cm$^2$, about 75-80 punches/cm$^2$, etc.).

In some embodiments of the invention, for example, thermal processing may comprise thermal point bonding. Thermal point bonding can be accomplished by passing the parallel-laid batt through a pressure nip formed by two rolls, one of which is heated and contains a plurality of raised protrusions having one or more geometric shapes (e.g., points, diamond shaped, circular, elliptical, dog-bone shaped, etc.) on its surface which impart or form corresponding discrete thermal bond sites on the fibrous web.

In accordance with certain embodiments of the invention, a plurality of individual homogenous webs of the carded fiber blend of carbon fibers and polymer matrix fibers may be laid-up in a variety of different configurations (e.g., lay-up orientations). For example, the plurality of individual homogenous webs may be subjected to a variety of lay-up orientations relative to each other (e.g., parallel-laid, orthogonally-laid, etc.). Each of the homogenous webs may be independently laid relative to adjacent homogenous webs. By way of example only, embodiments of the invention may comprise a first homogenous web being aligned in a first direction laid directly or indirectly onto or over a second homogenous web being aligned in a second direction, in which the first direction and the second direction are not the same. For instance, the first direction may be considered to be at 0° (as a point of reference) and the second direction may comprise 90° relative to the first direction (e.g., from between 5-175°, 20-160°, 40-140°, 60-120°, 80-100° relative to the first direction). For example, a [0/90] lay-up orientation references a first homogenous web aligned in a direction considered to be at 0° (as a point of reference) and a second homogenous web laid on top or over the first homogenous web, in which the second homogenous web is aligned in direction 90° relative to the alignment of the first homogenous web. In accordance to certain embodiments, the laid-up homogenous webs may define fiber batt. The formed batt may be fixed, such as by needle-punching, to form a fiber-reinforced nonwoven. The fiber-reinforced nonwoven may be subjected to a molding operation to form a fiber-reinforced nonwoven composite according to certain embodiments of the invention. In accordance with certain embodiments of the invention, each of the homogenous webs may be fixed, such as by needle-punching, prior to being laid-up in various configurations as discussed above.

In some embodiments including a plurality of individual homogenous webs laid-up in a variety of different configurations may define a fiber batt, which may be fixed by at least one of needle punching or thermal processing. According to certain embodiments of the invention, for instance, needle punching may comprise utilizing a needle penetration depth from about 5 mm to about 9 mm or from about 7 mm to about 10 mm according to certain other embodiments of the invention. In other embodiments of the invention, for example, needle punching may comprise utilizing a needle penetration depth of about 7 mm. As such, in certain embodiments of the invention, needle punching may comprise utilizing a needle penetration depth from at least about any of the following: 5, 5.5, 6, 6.5, and 7 mm and/or at most about 75, 50, 25, 15, 10, 9, 8.5, 8, 7.5, and 7 mm (e.g., about 5.5-75 mm, about 6.5-25 mm, etc.). The needle penetration depth may be from about 7 mm to about 10 mm according to certain other embodiments of the invention or from about 10 mm to about 75 mm according to yet certain other embodiments of the invention.

In some embodiment of the invention, for example, needle punching may comprise utilizing a punch density from about 50 punches/cm$^2$ to about 100 punches/cm$^2$. In further embodiments of the invention, for instance, needle punching may comprise utilizing a punch density of about 75 punches/cm$^2$. As such, in certain embodiments of the invention, needle punching may comprise utilizing a punch density from at least about any of the following: 50, 55, 60, 65, 70, and 75 punches/cm$^2$ and/or at most about 100, 95, 90, 85, 80, and 75 punches/cm$^2$ (e.g., about 60-85 punches/cm$^2$, about 75-80 punches/cm$^2$, etc.).

In some embodiments of the invention, for example, thermal processing may comprise thermal point bonding. Thermal point bonding can be accomplished by passing the fiber batt of the plurality of individually laid-up homogenous webs through a pressure nip formed by two rolls, one of which is heated and contains a plurality of raised protrusions having one or more geometric shapes (e.g., points, diamond shaped, circular, elliptical, dog-bone shaped, etc.) on its surface which impart or form corresponding discrete thermal bond sites on the fibrous web.

According to certain embodiments of the invention, for instance, molding the fiber-reinforced nonwoven to form the fiber-reinforced nonwoven composite may comprise a molding temperature from about 200° C. to about 300° C. In other embodiments of the invention, for example, molding the fiber-reinforced nonwoven to form the fiber-reinforced nonwoven composite may comprise a molding temperature from about 225° C. to about 275° C. In further embodiments of the invention, for instance, molding the fiber-reinforced nonwoven to form the fiber-reinforced nonwoven composite may comprise a molding temperature of about 260° C. As such, in certain embodiments, molding the fiber-reinforced nonwoven to form the fiber-reinforced nonwoven composite may comprise a molding temperature from at least about any of the following: 200, 225, 230, 240, 250, and 260° C. and/or at most about 300, 290, 280, 275, 270, and 260° C. (e.g., about 250-270° C., about 260-300° C., etc.).

In some embodiments of the invention, for example, molding the fiber-reinforced nonwoven to form the fiber-reinforced nonwoven composite may comprise hot compression molding. Hot compression molding may be accomplished by placing the fiber-reinforced nonwoven in an open, heated mold cavity. The mold may then be closed with a top force or plug member, pressure may be applied to force the material into contact with all mold areas, and heat and pressure may be maintained until the fiber-reinforced nonwoven composite has cured. In this regard, the fiber-reinforced nonwoven may be placed directly into a heated metal mold, then softened by the heat, and forced to conform to the shape of the mold as the mold closes to form the fiber-reinforced nonwoven composite.

In accordance with certain embodiments of the invention, for instance, the plurality of reinforcement fibers (e.g., carbon fibers) may comprise staple fibers. In some embodiments of the invention, for example, the plurality of carbon fibers may be uncrimped.

According to certain embodiments of the invention, for instance, the plurality of carbon fibers may comprise an average length from about 50 mm to about 125 mm. In other embodiments of the invention, for example, the plurality of carbon fibers may comprise an average length from about 60 mm to about 100 mm. In further embodiments of the invention, for instance, the plurality of carbon fibers may comprise an average length from about 65 mm to about 85 mm. In some embodiments of the invention, for example, the plurality of carbon fibers may comprise an average length of about 75 mm. As such, in certain embodiments of the invention, the plurality of carbon fibers may comprise an average length from at least about any of the following: 50, 55, 60, 65, 70, and 75 mm and/or at most about 125, 100, 95, 90, 85, 80, and 75 mm (e.g., about 50-80 mm, about 75-100 mm, etc.).

According to certain embodiments of the invention, for instance, the plurality of carbon fibers may comprise a linear mass density from about 0.1 dtex to about 1.0 dtex. In other embodiments of the invention, for example, the plurality of carbon fibers may comprise a linear mass density from about 0.5 dtex to about 1.0 dtex. In further embodiments of the invention, for instance, the plurality of carbon fibers may comprise a linear mass density of about 0.7 dtex. As such, in certain embodiments of the invention, the plurality of carbon fibers may comprise a linear mass density from at least about any of the following: 0.1, 0.2, 0.3, 0.4, 0.5, 0.6, and 0.7 dtex and/or at most about 1.0, 0.9, 0.8, and 0.7 dtex (e.g., about 0.3-0.9 dtex, about 0.5-1.0 dtex, etc.).

In accordance with certain embodiments of the invention, for example, the polymer matrix may comprise a plurality of polymeric staple fibers. In some embodiments of the invention, for instance, the plurality of polymeric staple fibers may comprise at least one of a thermoplastic polymer or a thermoset polymer. According to certain embodiments of the invention, for example, the plurality of polymeric staple fibers may comprise at least one of a polyester, a polycarbonate, a co-polyester, a polyamide, a polyphenylene sulfone, an engineering polymer, or any combination thereof. In some embodiments of the invention, for instance, the plurality of polymeric staple fibers may comprise a polyester. In further embodiments of the invention, for example, the plurality of polymeric staple fibers may comprise polyethylene terephthalate. In certain embodiments of the invention, for instance, the plurality of polymeric staple fibers may comprise bicomponent fibers.

According to certain embodiments of the invention, for example, the plurality of polymeric staple fibers may comprise an average length from about 1 mm to about 100 mm. In other embodiments of the invention, for instance, the plurality of polymeric staple fibers may comprise an average length from about 1 mm to about 50 mm. In further embodiments of the invention, for example, the plurality of polymeric staple fibers may comprise an average length of about 38 mm. As such, in certain embodiments of the invention, the plurality of carbon fibers may comprise an average length from at least about any of the following: 1, 10, 20, 30, 35, and 38 mm and/or at most about 50, 48, 45, 42, 40, and 38 mm (e.g., about 20-50 mm, about 35-42 mm, etc.).

According to certain embodiments of the invention, for instance, the plurality of polymeric staple fibers may comprise a linear mass density from about 1.0 dtex to about 3.0 dtex. In other embodiments of the invention, for example, the plurality of polymeric staple fibers may comprise a linear mass density from about 1.3 dtex to about 1.8 dtex. In further embodiments of the invention, for instance, the plurality of polymeric staple fibers may comprise a linear mass density of about 1.6 dtex. As such, in certain embodiments of the invention, the plurality of carbon fibers may comprise a linear mass density from at least about any of the following: 1.0, 1.1, 1.2, 1.3, 1.4, 1.5, and 1.6 dtex and/or at most about 3.0, 2.0, 1.9, 1.8, 1.7, and 1.6 dtex (e.g., about 1.1-1.7 dtex, about 1.5-1.7 dtex, etc.).

In this regard, a fiber-reinforced nonWoven composite comprising a plurality of carbon fibers and a polymer matrix may be formed such that the plurality of carbon fibers have an average fiber length from about 50 mm to about 125 mm, and the fiber-reinforced nonwoven composite may comprise a theoretical void volume from about 0% to about 10%.

The fiber-reinforced nonwoven composite produced according to certain embodiments of the invention may comprise a basis weight from about 1000 gsm to about 5000 gsm. In other embodiments of the invention, for instance, the fiber-reinforced nonwoven composite may comprise a basis weight from about 1500 gsm to about 4000 gsm. In further embodiments of the invention, for example, the fiber-reinforced nonwoven composite may comprise a basis weight from about 2000 gsm to about 3000 gsm. In some embodiments of the invention, for instance, the fiber-reinforced nonwoven composite may comprise a basis weight of about 2500 gsm. As such, in certain embodiments of the invention, the fiber-reinforced nonwoven composite may comprise a basis weight from at least about any of the following: 1000, 1500, 2000, and 2500 gsm and/or at most about 5000, 4500, 4000, 3500, 3000, and 2500 gsm (e.g., about 1000-4000 gsm, about 2000-3000 gsm, etc.).

The fiber-reinforced nonwoven composite produced according to certain embodiments of the invention may comprise an average thickness from about 1 mm to about 3 mm. In further embodiments of the invention, for instance, the fiber-reinforced nonwoven composite may comprise an average thickness of about 1.75 mm. As such, in certain embodiments of the invention, the fiber-reinforced nonwoven composite may comprise an average thickness from at least about any of the following: 1, 1.25, 1.5, and 1.75 mm and/or at most about 3, 2.75, 2.5, 2.25, 2, and 1.75 mm (e.g., about 1.5-3 mm, about 1-2 mm, etc.).

The fiber-reinforced nonwoven composite produced according to certain embodiments of the invention may comprise a composite density from about 1 g/cm$^3$ to about 5 g/cm$^3$. In other embodiments of the invention, for instance, the fiber-reinforced nonwoven composite may comprise a composite density from about 1 g/cm$^3$ to about 2 g/cm$^3$. In further embodiments of the invention, for example, the fiber-reinforced nonwoven composite may comprise a composite density from about 1.3 g/cm$^3$ to about 1.5 g/cm$^3$. As such, in certain embodiments of the invention, the fiber-reinforced nonwoven composite may comprise a composite density from at least about any of the following: 1, 1.1, 1.2, and 1.3 g/cm³ and/or at most about 5, 4, 3, 2, and 1.5 g/cm³ (e.g., about 1.1-1.5 g/cm³, about 1.3-5 g/cm³, etc.).

The fiber-reinforced nonwoven composite produced according to certain embodiments of the invention may comprise from about 10 wt. % to about 100 wt. % carbon fiber and from about 0 wt. % to about 90 wt. % polymer matrix. In other embodiments of the invention, for example, the fiber-reinforced nonwoven composite may comprise from about 10 wt. % to about 90 wt. % carbon fiber and from about 10 wt. % to about 90 wt. % polymer matrix. In further embodiments of the invention, for instance, the fiber-reinforced nonwoven composite may comprise from about 10 wt. % to about 60 wt. % carbon fiber and from about 40 wt. % to about 90 wt. % polymer matrix. According to certain embodiments of the invention, for example, the fiber-reinforced nonwoven composite may comprise from about 20 wt. % to about 50 wt. % carbon fiber and from about 50 wt. % to about 80 wt. % polymer matrix. In some embodiments of the invention, for instance, the fiber-reinforced nonwoven composite may comprise from about 30 wt. % to about 40 wt. % carbon fiber and from about 60 wt. % to about 70 wt. % polymer matrix. As such, in certain embodiments of the invention, the fiber-reinforced nonwoven composite may comprise a weight percentage of carbon fiber from at least about any of the following: 10, 15, 20, 25, and 30 wt. % and/or at most about 100, 90, 60, 50, and 40 wt. % (e.g., about 30-50 wt. %, about 25-60 wt. %, etc.). Moreover, in certain embodiments of the invention, the fiber-reinforced nonwoven composite may comprise a weight percentage of polymer matrix from at least about any of the following: 0, 5, 10, 20, 30, 40, 50, and 60 wt. % and/or at most about 90, 85, 80, 75, and 70 wt. % (e.g., about 40-80 wt. %, about 60-90 wt. %, etc.).

The fiber-reinforced nonwoven composite produced according to certain embodiments of the invention may comprise a theoretical void volume from about −10% to about 15%. According to certain embodiments of the invention, for instance, the fiber-reinforced nonwoven composite may comprise a theoretical void volume from about 0% to about 10%. In some embodiments of the invention, for example, the fiber-reinforced nonwoven composite may comprise a theoretical void volume from about 0% to about 7%. In further embodiments of the invention, for instance, the fiber-reinforced nonwoven composite may comprise a theoretical void volume from about 0% to about 5%. In other embodiments of the invention, for example, the fiber-reinforced nonwoven composite may comprise a theoretical void volume from about 0% to about 1%. As such, in certain embodiments of the invention, the fiber-reinforced nonwoven composite may comprise a theoretical void volume from at least about any of the following: −10, −9, −8, −7, −6, −5, −4, −3, −2, −1, and 0% and/or at most about 15, 12, 10, 9, 8, 7, 6, 5, 4, 3, 2, and 1% (e.g., about 0-12%, about 0-5%, etc.).

In accordance with certain embodiments of the invention, for instance, the fiber-reinforced nonwoven composite may comprise a plurality of individual homogenous webs having a [0/90] lay-up. In some embodiments of the invention, for example, the fiber-reinforced nonwoven composite may comprise about 40 wt. % carbon fiber and about 60 wt. % thermoplastic polymer matrix. In such embodiments of the invention, for instance, the fiber-reinforced nonwoven composite may comprise a tensile modulus from about 1.5 GPa to about 50 GPa. Moreover, for example, the fiber-reinforced nonwoven composite may comprise a tensile strength from about 140 MPa to about 600 MPa. In addition, for instance, the fiber-reinforced nonwoven composite may comprise a flexural modulus from about 15 GPa to about 50 GPa. Furthermore, for example, the fiber-reinforced nonwoven composite may comprise a flexural strength from about 290 MPa to about 465 MPa.

In other embodiments of the invention, for instance, the fiber-reinforced nonwoven composite may comprise a plurality of individual homogenous webs having a [0/90] lay-up, about 30 wt. % carbon fiber, and about 70 wt. % thermoplastic polymer matrix. In such embodiments of the invention, for example, the fiber-reinforced nonwoven composite may comprise a tensile modulus from about 15 GPa to about 30 GPa. Moreover, for instance, the fiber-reinforced nonwoven composite may comprise a tensile strength from about 220 MPa to about 310 MPa. In addition, for example, the fiber-reinforced nonwoven composite may comprise a flexural modulus from about 10 GPa to about 25 GPa. Furthermore, for instance, the fiber-reinforced nonwoven composite may comprise a flexural strength from about 315 MPa to about 385 MPa.

In accordance with certain embodiments of the invention, the fiber-reinforced nonwoven composite may further comprise an epoxy resin. According to certain embodiments of the invention, the fiber-reinforced nonwoven composite may comprise a structural element utilized in an industry selected from the group consisting of leisure goods, aerospace, electronics, equipment, energy generation, mass transport, automotive parts, marine, construction, defense, and sports.

IV. Applications for a Fiber-Reinforced Nonwoven Composite

According to certain embodiments of the invention, the fiber-reinforced nonwoven composite may comprise a structural element utilized in an industry selected from the group consisting of leisure goods, aerospace, electronics, equipment, energy generation, mass transport, automotive parts, marine, construction, defense, and sports.

EXAMPLES

The present disclosure is further illustrated by the following examples, which in no way should be construed as being limiting. That is, the specific features described in the following examples are merely illustrative and not limiting.

Example 1

Example 1 was made by blending and carding PET fibers from Advansa GmbH, Frielinghauser Str. 5, 59071 Hamm, Germany, (product code is 1.6-38-158 NSD Merge 123 E56) with carbon staple fibers from William Barnet & Son, 1300 Hayne Street, Spartanburg, S.C. 29301. The PET fibers had a 38 mm cut length and a linear density of 1.62 dtex. The carbon fibers were about 6 microns in diameter and had a cut length of 50 mm. The carbon fibers were treated with a similar PET fiber finish as the Advansa PET fibers prior to cutting. The relative content of this example was 60 wt. % PET and 40 wt. % carbon fibers. The web was then cross-lapped and lightly needled into a 500 gsm web to form a consolidated nonwoven.

Five pieces having dimensions of 300 mm×500 mm were cut from the nonwoven on 1 meter wide roll goods into 300 mm×500 mm samples and were layered, keeping the same orientation as the roll goods, to create a 2500 gsm mat that was molded on a hydraulic press equipped with two dies having parallel surfaces that can be pressed toward each other while the sample is positioned between them. This press is equipped with a stop that controls the minimum separation between the plates. For this example, the stop created a gap of 2 mm between the parallel plates.

The molding step consisted of first positioning the 5 pieces of nonwoven between the parallel plates of the press and applying 220 psi (1.51 MPa). Then, heat was also applied to the parallel plates until they reached a temperature of 260° C. At that point, the pressure applied to the plate was raised to 1088 psi (7.5 MPa) for approximately 2 minutes, then cooling was applied to the plates, and the pressure was removed when the plate temperature was reduced to 40° C.

Using a table saw, coupons were removed in the machine direction (MD) and cross direction (CD) from the formed plates and tested according to DIN EN ISO 527. The examples were produced as per the Type 2 requirements of the standard, and each data point is the average of the measurements made on 5 different coupons (N=5 on each data point).

Example 2

A plate was molded according to Example 1 with the exception that the thickness of the stop was reduced to 1.5 mm.

Example 3

This example was made according to Example 1 with the exception that the carbon fibers had a length of 75 mm. For this example, the stop for the minimum distance between the plates was the same as Example 1 at 2 mm.

Example 4

This example was made according to Example 3 with the exception that the stop was set at 1.75 mm.

Example 5

This example was made according to Example 3 with the exception that the stop was set at 1.5 mm.

The test results for those samples can be found in Tables 1-3 below.

TABLE 1

| Units | Carbon fiber length mm | Set minimum gap for the press mm | Average measured thickness mm | Calculated void volume % | MD Tensile strength Mpa | MD Tensile strain % | MD tensile modulus Gpa |
|---|---|---|---|---|---|---|---|
| Example 1 | 50 | 2 | 1.91 | 16 | 233 | 1.45 | 17.9 |
| Example 2 | 50 | 1.5 | 1.75 | 6 | 223 | 1.34 | 19.7 |
| Example 3 | 75 | 2 | 1.93 | 18 | 156 | 1.29 | 13.1 |
| Example 4 | 75 | 1.75 | 1.76 | 7 | 242 | 1.51 | 18.8 |
| Example 5 | 75 | 1.5 | 1.55 | −6 | 229 | 1.64 | 16.7 |

TABLE 2

| Units | Average width of MD coupons mm | Average thickness of MD coupons mm | CD Tensile strength Mpa | CD Tensile strain % | CD tensile modulus Gpa | Average width of CD coupons mm |
|---|---|---|---|---|---|---|
| Example 1 | 24.99 | 1.91 | 447 | 1.38 | 33 | 24.96 |
| Example 2 | 25.05 | 1.76 | 422 | 1.28 | 34.5 | 24.99 |
| Example 3 | 24.91 | 1.95 | 329 | 0.98 | 32.9 | 24.96 |
| Example 4 | 25.03 | 1.79 | 518 | 1.19 | 43.6 | 24.99 |
| Example 5 | 25.07 | 1.56 | 535 | 1.45 | 36.6 | 24.99 |

TABLE 3

| Units | Average thickness of CD coupons mm | Composite tensile strength Mpa | Composite tensile modulus Gpa |
|---|---|---|---|
| Example 1 | 1.9 | 680 | 50.9 |
| Example 2 | 1.73 | 645 | 54.2 |
| Example 3 | 1.91 | 486 | 46.0 |
| Example 4 | 1.73 | 760 | 62.4 |
| Example 5 | 1.53 | 763 | 53.3 |

Figure 4:
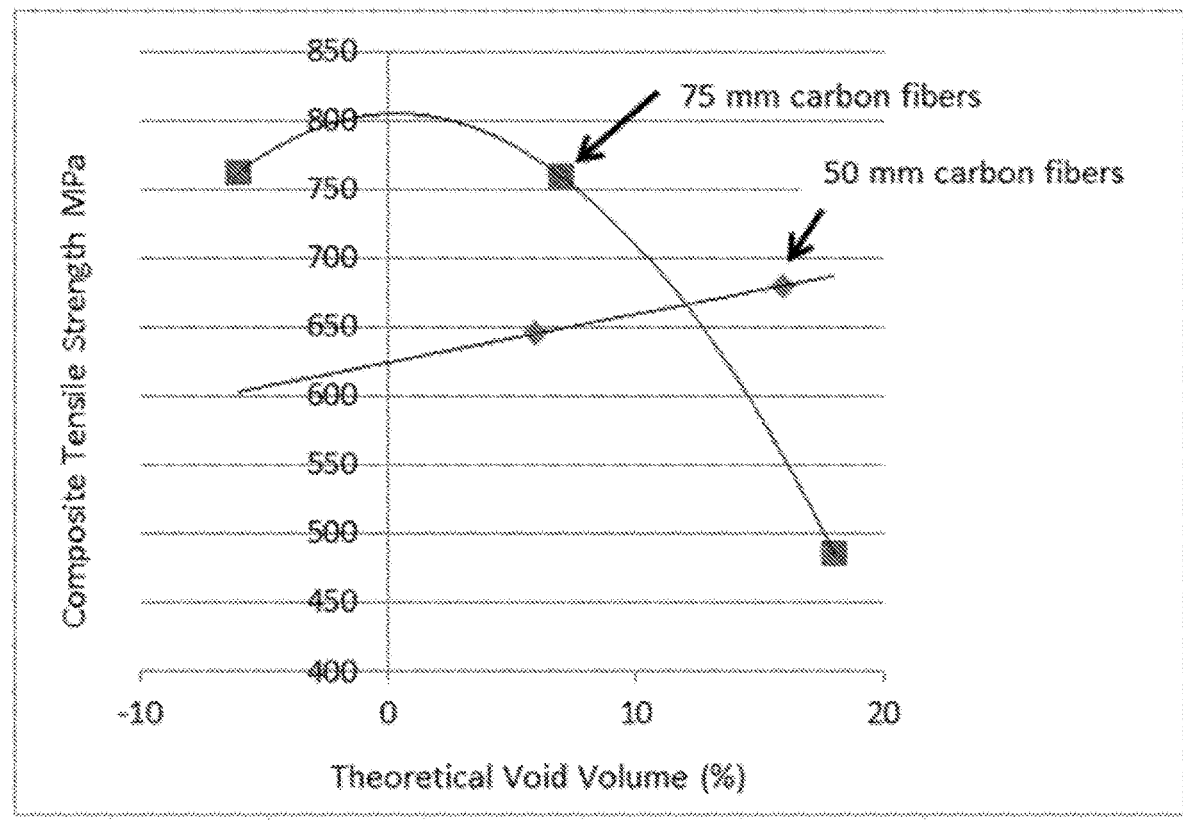
FIG. 4 illustrates the impact of carbon fiber length and theoretical void volume on tensile strength according to an embodiment of the invention.

FIG. 4 illustrates the impact of carbon fiber length and theoretical void volume on tensile strength according to an embodiment of the invention. As shown in FIG. 4, the results of composite tensile strength vs. void volume are plotted for the carbon fibers at 50 mm length (Examples 1 and 2) and 75 mm length (Examples 3-5). For Examples 3-5, the tensile strength increased as the theoretical void volume dropped toward zero. As such, the composite tensile strength was the highest at or below 6% theoretical void volume. When a minimum gap of 1.5 mm was used, the theoretical void volume was −7%. This result does not reflect a change in density for the material but instead reflects some of the material being pushed out at the edge of the plates due to excessive pressure.

Figure 5:
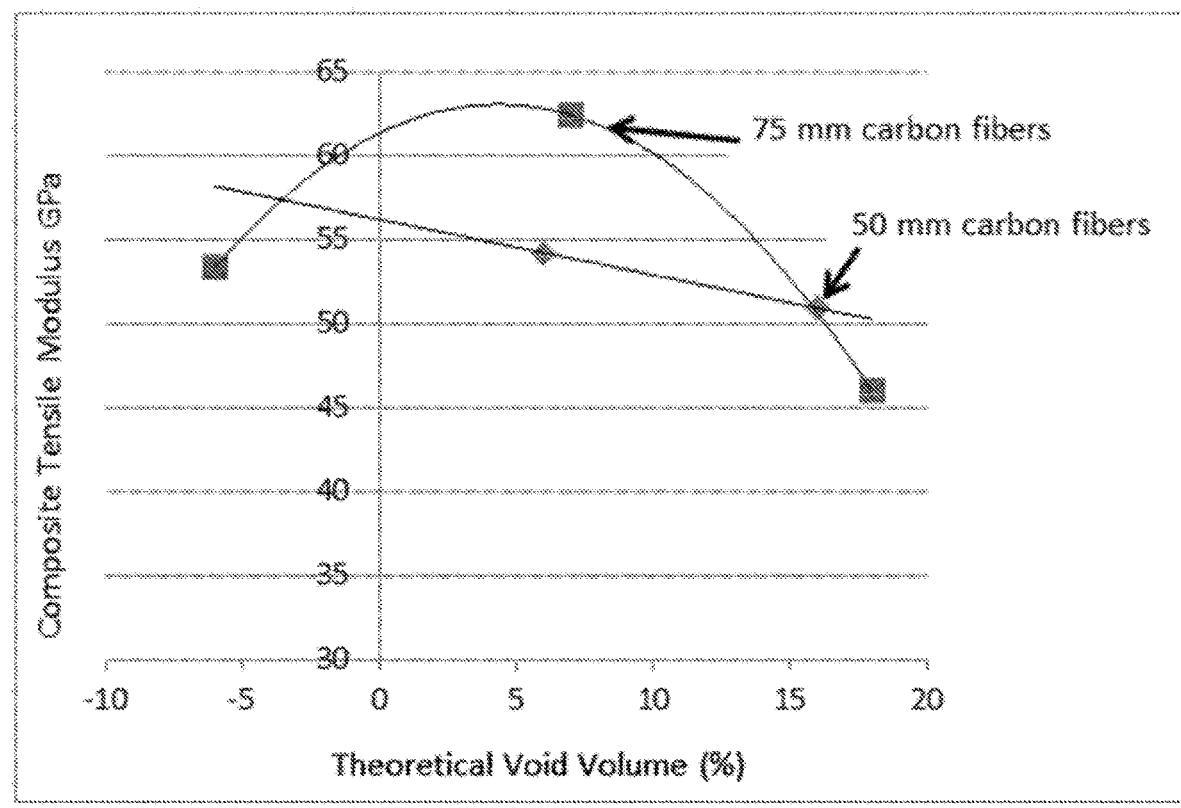
FIG. 5 illustrates the impact of carbon fiber length and theoretical void volume on tensile modulus according to an embodiment of the invention.

FIG. 5 illustrates the impact of carbon fiber length and theoretical void volume on tensile modulus according to an embodiment of the invention. As shown in FIG. 5, the composite tensile modulus was plotted against theoretical void volume. The composite made with the 75 mm long carbon fibers performed better than the composite made of 50 mm long carbon fibers when the theoretical void volume was between 0 and 10%. A drop in composite tensile modulus was observed when the theoretical void volume was negative due to the fact that the negative value corresponds to some of the material being pushed out of the plate. As such, when the theoretical void volume is less than 10%, and, more precisely at 7% or lower, stronger composites are possible when the fiber length increases (e.g., from 50 to 75 mm).

Without wishing to be bound by theory, these results may be due to the fact that the lower void volume creates a more intimate contact between the matrix polymer and the reinforcing carbon fiber. As a result, the failure mechanism becomes dependent on the force needed to pull the carbon fibers out of the matrix, and a longer fiber favors a better anchoring of those fibers. At higher void volumes, this mechanism may be less important and may be overshadowed by the better distribution expected to be obtained with the 50 mm carbon fibers.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

That which is claimed:

1. A process for forming a fiber-reinforced nonwoven composite, comprising:
   opening a plurality of carbon fibers and a plurality of polymeric staple fibers, said plurality of carbon fibers having an average fiber length from about 50 mm to about 125 mm;
   blending the plurality of carbon fibers with the plurality of polymeric staple fibers to form a fiber blend;
   carding the fiber blend to form a one or more homogenous webs;
   forming a fiber-reinforced nonwoven from the one or more homogenous webs; and
   molding the fiber-reinforced nonwoven to form a fiber-reinforced nonwoven composite, wherein the fiber-reinforced nonwoven composite comprises a theoretical void volume from about 0% to about 10% and a composite density from about 3 g/cm$^3$ to about 5 g/cm$^3$.

2. The process according to claim 1, further comprising:
   layering at least a first homogenous web from the one or more homogenous webs upon itself in a machine direction to form a parallel-laid batt; and
   fixing the parallel-laid batt to form the fiber-reinforced nonwoven.

3. The process according to claim 2, wherein fixing the parallel-laid batt comprises at least one of needle punching or thermal processing.

4. The process according to claim 2, wherein needle punching comprises utilizing a needle penetration depth from about 10 mm to about 75 mm, a punch density from about 50 punches/cm$^2$ to about 100 punches/cm$^2$, or both.

5. The process according to claim 2, wherein thermal processing comprises thermal point bonding.

6. The process according to claim 1, wherein molding the fiber-reinforced nonwoven to form the fiber-reinforced nonwoven composite comprises a molding temperature from about 200° C. to about 300° C.

7. The process according to claim 1, wherein the carbon fibers comprise from about 10% to about 90% by weight of the fiber-reinforced nonwoven composite.

8. The process according to claim 1, wherein the carbon fibers comprise from about 40% to about 60% by weight of the fiber-reinforced nonwoven composite.

9. The process according to claim 1, wherein the polymeric staple fibers comprise from about 10% to about 90% by weight of the fiber-reinforced nonwoven composite.

10. The process according to claim 1, wherein the polymeric staple fibers comprise from about 40% to about 60% by weight of the fiber-reinforced nonwoven composite.

11. The process according to claim 1, wherein the plurality of carbon fibers comprise a linear mass density from about 0.1 dtex to about 1.0 dtex.

12. The process according to claim 1, wherein the plurality of polymeric staple fibers comprise at least one of a polyester, a polycarbonate, a co-polyester, a polyamide, a polyphenylene sulfone, an engineering polymer, or any combination thereof.

13. The process according to claim 1, wherein the plurality of polymeric staple fibers comprise an average length from about 1 mm to about 100 mm.

14. The process according to claim 1, wherein the plurality of polymeric staple fibers comprise a linear mass density from about 1.0 dtex to about 3.0 dtex.

15. The process according to claim 1, wherein the fiber-reinforced nonwoven composite comprises a basis weight from about 500 gsm to about 5000 gsm.

16. The process according to claim 1, wherein the fiber-reinforced nonwoven composite comprises an average thickness from about 1 mm to about 3 mm.

17. The process according to claim 1, further comprising aligning a first group of carbon fibers in a first direction in a first plane and aligning a second group of carbon fibers in a second direction in a second plane, and wherein the second direction is located from 20° to 90° relative to the first direction.

18. The process according to claim 1, wherein the fiber-reinforced nonwoven composite has a flexural strength from about 290 MPa to about 465 MPa.

19. The process according to claim 1, wherein the plurality of polymeric staple fibers comprises a polyethylene terephthalate accounting for about 30% to about 70% by weight of the fiber-reinforced nonwoven composite, and the carbon fibers comprise from about 30% to about 70% by weight of the fiber-reinforced nonwoven composite; wherein the fiber-reinforced nonwoven composite comprises an average thickness from about 1 mm to about 3 mm and has a basis weight from about 2000 gsm to about 5000 gsm.

* * * * *